No. 803,186. PATENTED OCT. 31, 1905.
T. R. McKNIGHT.
EARTH AND BALLAST SPREADER.
APPLICATION FILED MAY 7, 1903.

6 SHEETS—SHEET 3.

Witnesses:
Inventor:
Thomas R. McKnight
his Attys.

No. 803,186. PATENTED OCT. 31, 1905.
T. R. McKNIGHT.
EARTH AND BALLAST SPREADER.
APPLICATION FILED MAY 7, 1903.
6 SHEETS—SHEET 4.
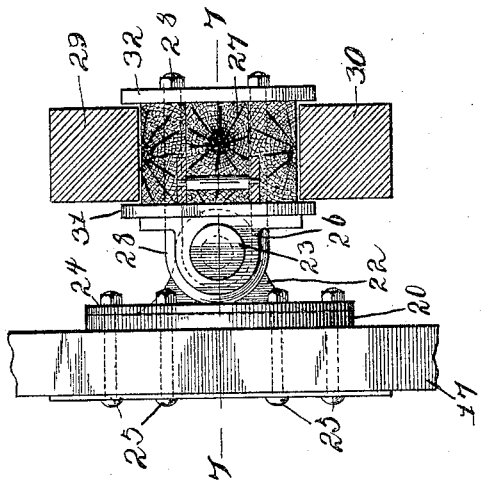
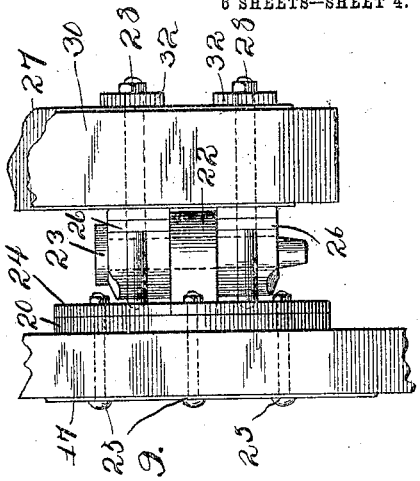
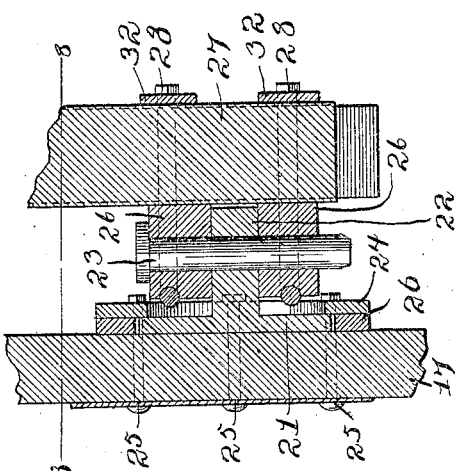
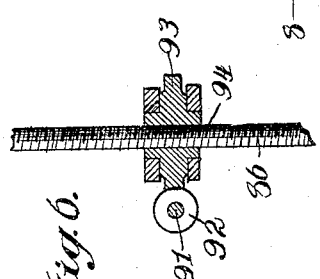
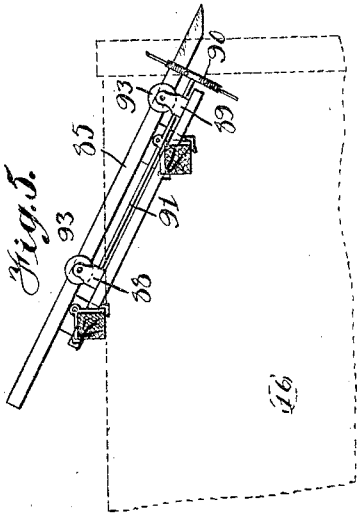
Witnesses:
Inventor:
Thomas R. McKnight,
his Attys.

No. 803,186. PATENTED OCT. 31, 1905.
T. R. McKNIGHT.
EARTH AND BALLAST SPREADER.
APPLICATION FILED MAY 7, 1903.

6 SHEETS—SHEET 5.

Witnesses:
Inventor:
Thomas R. McKnight,
by his Attys.

No. 803,186. PATENTED OCT. 31, 1905.
T. R. McKNIGHT.
EARTH AND BALLAST SPREADER.
APPLICATION FILED MAY 7, 1903.
6 SHEETS—SHEET 6.
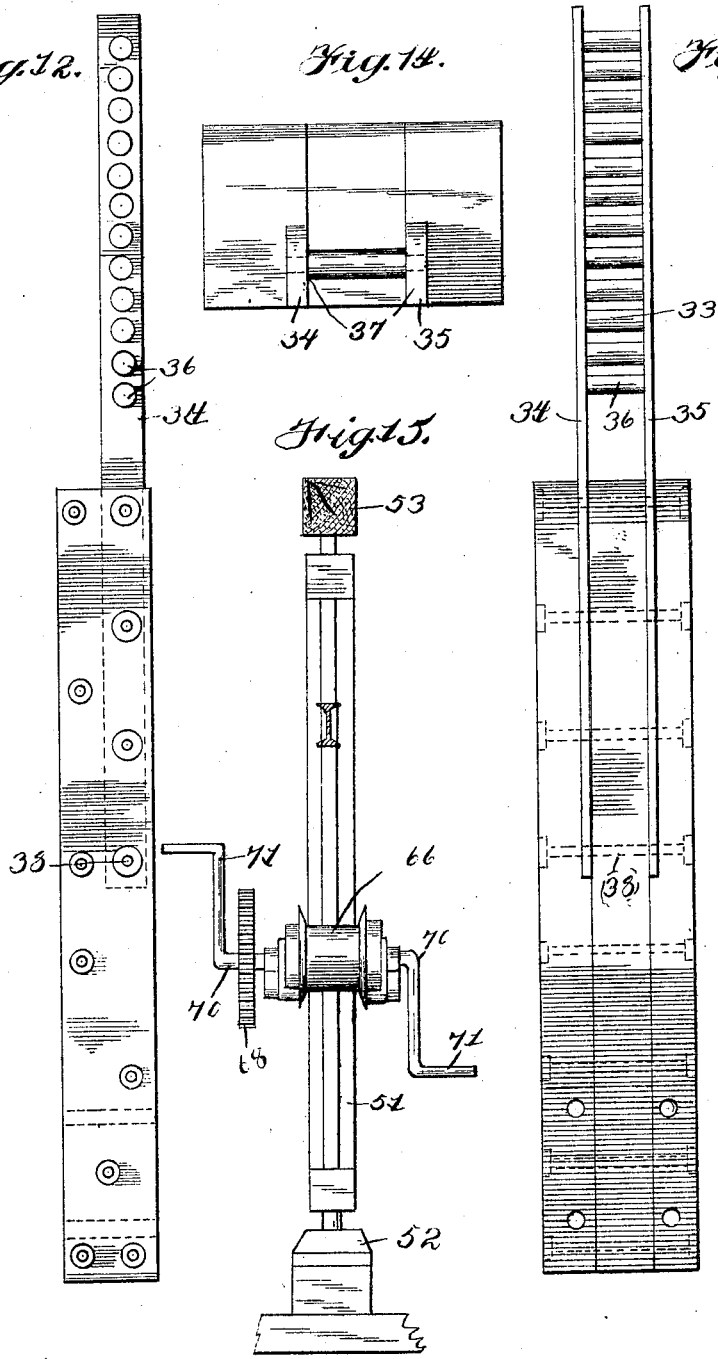
Witnesses:
Inventor:
Thomas R. McKnight,

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

EARTH AND BALLAST SPREADER.

No. 803,186. Specification of Letters Patent. Patented Oct. 31, 1905.

Application filed May 7, 1903. Serial No. 155,999.

*To all whom it may concern:*

Be it known that I, THOMAS R. McKNIGHT, a citizen of the United States, residing at Aurora, in the county of Kane and State of Illinois, have invented certain new and useful Improvements in Earth and Ballast Spreaders, of which the following is a specification, reference being had to the accompanying drawings.

My invention relates to grading machinery, and has particularly to do with machines for spreading earth and ballast in railway-construction work. Such machines as heretofore constructed have consisted generally of a car mounted on trucks adapted to run on a railway-track, the car serving as the body of the machine and supporting the scraping devices and the operating mechanism therefor, the scraping devices being connected at one end to the car and extending laterally at one or both sides thereof, so as to engage and spread the earth or ballast.

The principal objects of my invention are to provide certain improvements in machines of this class by which the scraper or scrapers may be readily adjusted to throw their rear ends outward or inward or to vertically adjust one or both ends thereof.

My improvements provide also for supporting the scrapers so that they may be readily detached or may be swung inward without detaching them and their rear ends secured upon the car for transportation purposes. I also provide auxiliary scrapers at the ends of the car for removing dirt or ballast from the rails on which the car runs.

To these ends my invention consists in the features of construction hereinafter described, and particularly pointed out in the claims.

It will be understood that except in so far as the specific details of the construction shown are particularly claimed my invention is not restricted to such details of construction, but includes the generic features set forth in the broader claims.

Figure 1:
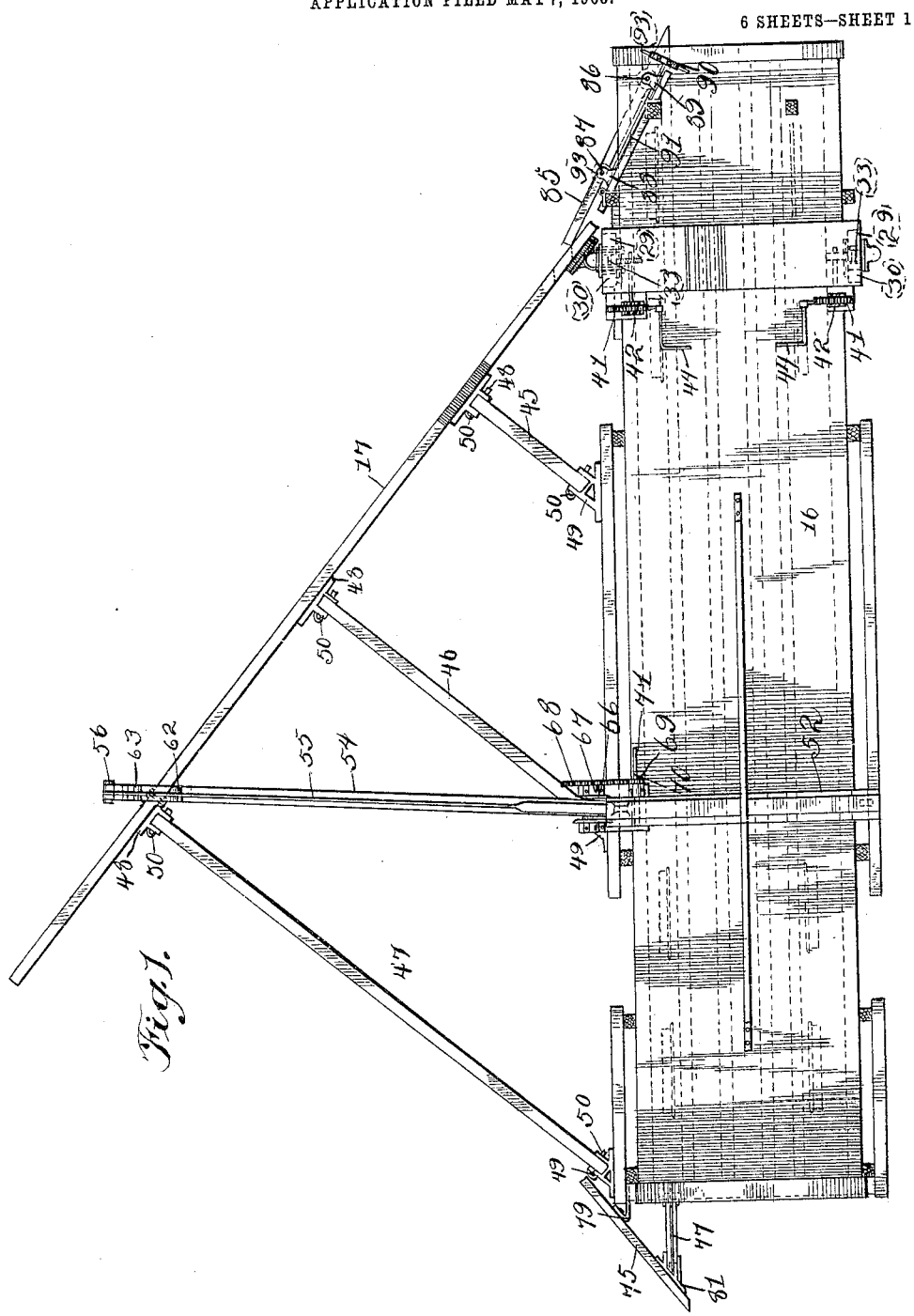
Figure 2:
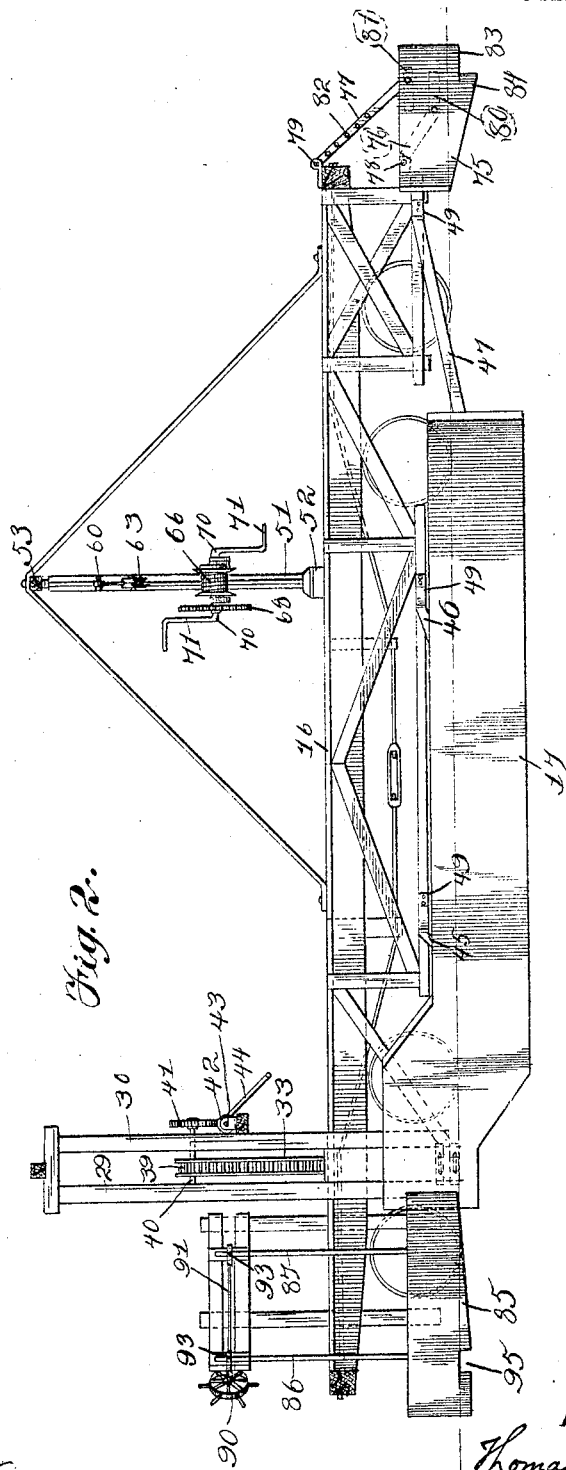
Figure 3:
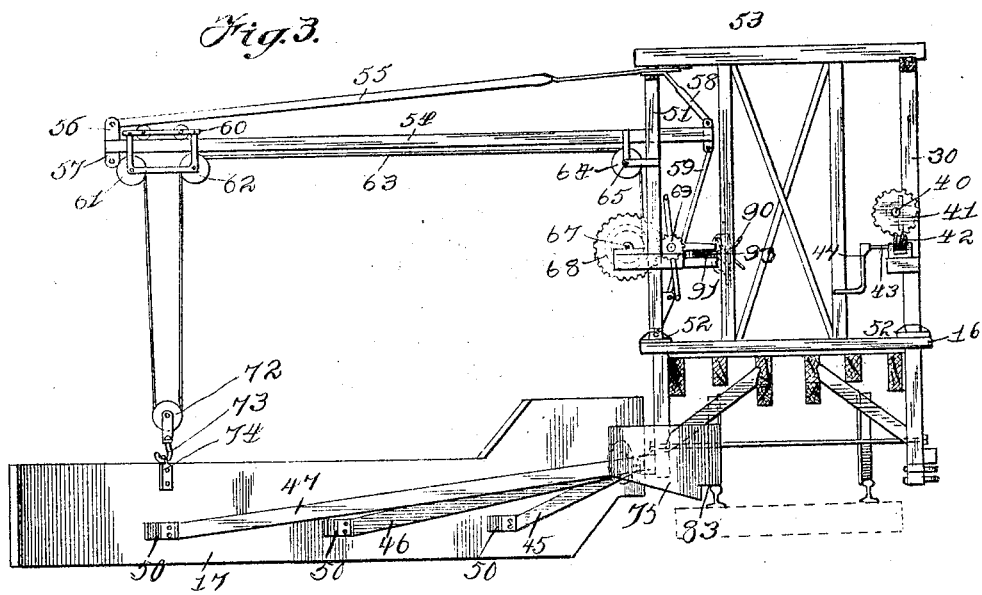
Figure 4:
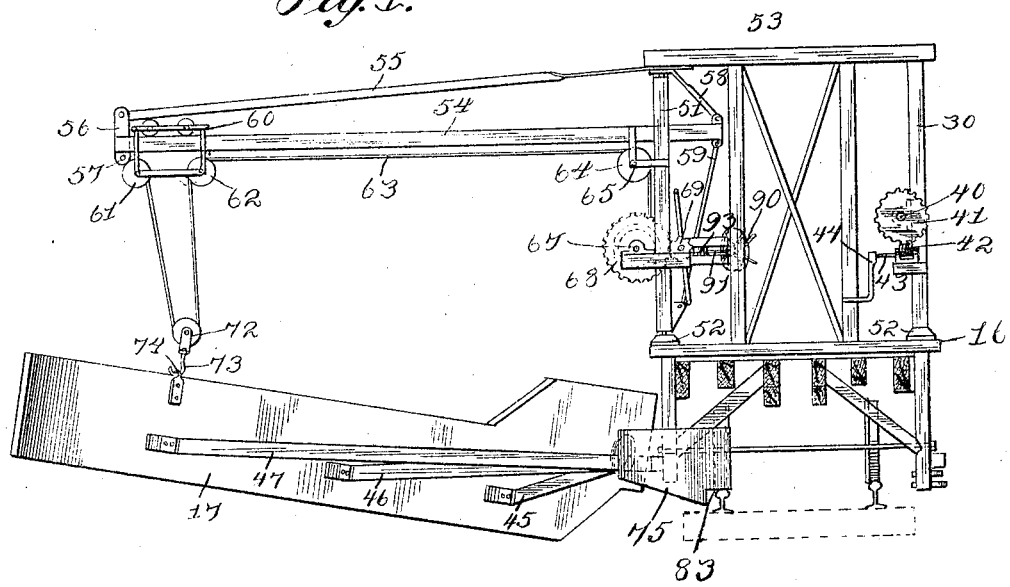
Figure 11:
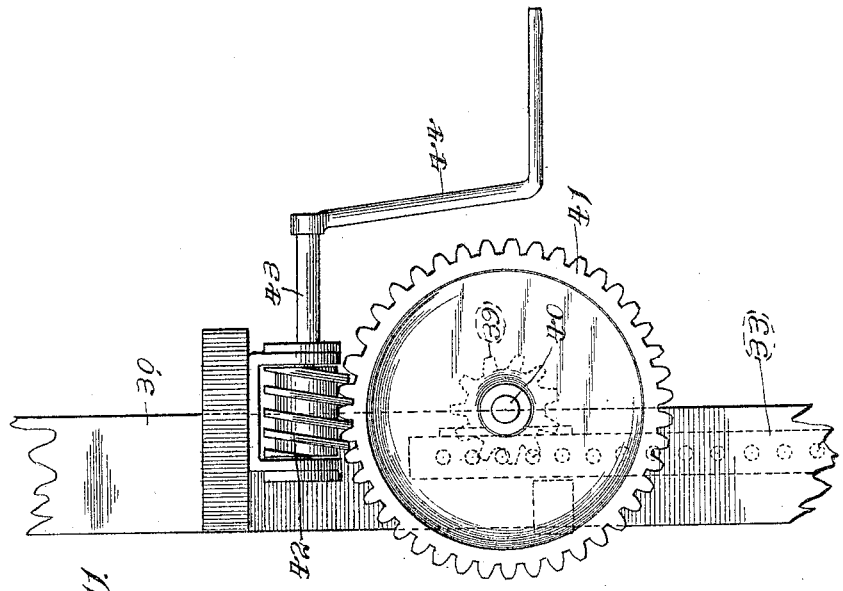
Figure 10:
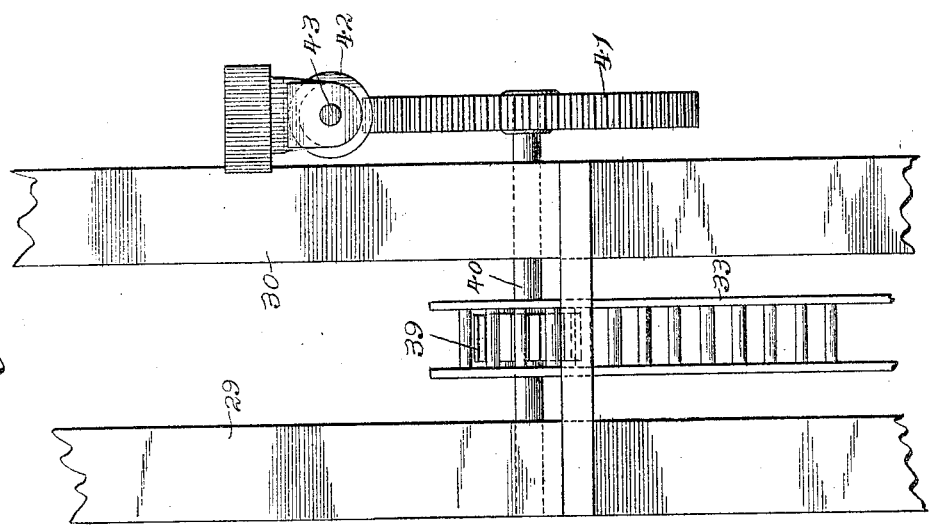

In the accompanying drawings, Figure 1 is a plan view. Fig. 2 is a side elevation. Figs. 3 and 4 are end elevations showing the scraper-blade in different positions of adjustment. Fig. 5 is a detail, being a plan view illustrating one of the auxiliary scrapers and the operating devices therefor. Fig. 6 is an enlarged detail, partly in section, showing a part of the adjusting mechanism for the scraper shown in Fig. 5. Fig. 7 is an enlarged detail, being a vertical section on line 7 7 of Fig. 8. Fig. 8 is an enlarged detail, being a horizontal section on line 8 8 of Fig. 7. Fig. 9 is a side elevation of the parts shown in Fig. 8. Fig. 10 is an enlarged detail, being a partial side elevation illustrating the mechanism for vertically adjusting the inner or front ends of the laterally-projecting or main scrapers. Fig. 11 is an edge view of the parts shown in Fig. 10. Figs. 12 and 13 are details further illustrating part of the mechanism by which the lateral scrapers are vertically adjusted. Fig. 14 is a plan view of the parts shown in Figs. 12 and 13; and Fig. 15 is a detail, being an enlarged view of the hoisting mechanism by which the lateral scraper or scrapers are adjusted.

Referring to the drawings, 16 indicates a car, which is preferably in the form of an ordinary coal-car divided into compartments, some of which may contain ballast and others operating mechanism for the scraper or scrapers.

I wish to explain here that in the drawings I have shown the machine as provided with only one lateral or main scraper; but it will be understood that a similar scraper may be provided at the other side of the car. A description of one of the scrapers, however, will suffice for both, it being understood that where two scrapers are used two duplicate sets of operating mechanism are provided.

17 indicates the main or laterally-projecting scraper, which for brevity will hereinafter be termed the "scraper." 18 19 indicate smaller scraper-blades, which are provided at the ends of the car for clearing the rails. These scraper-blades will be hereinafter termed "auxiliary" scrapers.

As best shown in Fig. 1, the scraper 17 is connected at its forward end with the car, near the forward end thereof, and when in operative position, as shown in Fig. 1, extends backward and outward, usually at an angle of about forty-five degrees to the car-body. The scraper 17 is connected to the car so as to permit its outer end to swing in or out and up or down. To this end what may be termed a "universal connection" is provided near the front end of the scraper, said connection being best shown in Figs. 7, 8, and 9. As shown in Fig. 7, the scraper 17 is provided on its inner face with a ring 20, which is fixedly secured thereto and receives a disk 21, provided with a projecting ear 22, the latter having a vertical passage therethrough to receive a pivot-pin 23. The disk 21 is held in place in the ring 20, without interfering with its freedom of rotation, by a ring 24, which overlies the ring 20 and is secured fixedly thereto by bolts 25 or other suitable means. The ear 22 is adapted to project between lugs 26, carried by a vertically-adjustable support 27, so that when said pin 23 is in place the disk 21 is hinged to the support 27, being adapted to swing about the pivot-pin 23, which, as shown in Fig. 9, is vertically disposed. Inasmuch as the scraper 17 is secured to the disk 21, said scraper may swing about the pivot 23 as an axis. Also, since the disk 21 is free to rotate within the ring 20, the scraper 17 may be swung about the disk 21 as an axis. A substantially universal connection is thus provided between the scraper and the support 27.

The lugs 26, in which the pivot-pin 23 is mounted, are preferably formed separately from the support 27 and are secured thereto by U-shaped bolts 28. (Best shown in Fig. 8.) The support 27 is vertically adjustable on the car, and to this end it is mounted between uprights 29 30, which form guides therefor, plates 31 32, which are secured to the support 27 and project beyond the side edges of the uprights 29 30, serving to hold said support in place, as shown in Fig. 8. The bolts 28, which secure the lugs 26 to the support 27, also secure the plates 31 32 in place. For vertically adjusting the support 27 I provide a rack 33, preferably composed of side bars 34 35 and cross-bars 36, connecting them. As shown in Fig. 14, the cross-bars 36 are turned down near their ends, forming shoulders 37, which abut against the side bars 34 35, thereby holding them properly apart. The lower end of the rack 33 is secured in the support 27, preferably by bolts 38, extending through said support and said side bars, as shown in Fig. 13. The upper end of the rack projects beyond the upper end of the support and is adapted to be engaged by a pinion 39, mounted on a shaft 40, supported in suitable bearings in the uprights 29 30. The shaft 40 carries a worm-wheel 41, which meshes with a worm 42, mounted on an operating-shaft 43, provided with a crank 44, so that the operator by rotating the crank 44 may rotate the pinion 39 to raise or lower the rack 33 and correspondingly adjust the inner end of the scraper 17.

When in operative position, the scraper 17 is secured in position by braces 45 46 47. (Best shown in Fig. 1.) As shown, said braces are of suitable lengths to hold the scraper at the proper angle. They are secured at their ends in sockets 48, carried by the scraper, and in sockets 49, suitably supported at the side of the car. Pins 50 secure the braces in position. Obviously by withdrawing the pins 50 the braces 45 46 47 may be removed, thereby releasing the scraper, which may then be swung in or out, as desired. It will be understood that for changing the operative position of the scraper angularly braces of different lengths may be substituted. For transportation purposes the braces 45 46 47 are removed, when the scraper 17 may be thrown back upon the edge of the car without detaching its front end, or, if desired, by removing the pivot-pin 23 the scraper may be entirely detached and placed upon the car.

The outer end of the scraper 17 is supported while in operation and is vertically adjusted by means of the mechanism which will now be described.

51 indicates the vertical shaft of a crane, which is pivotally supported at its lower end in a block 52, carried by the car, and at its upper end is pivotally fitted in a beam 53, also carried by the car.

54 indicates the jib of the crane, which is secured near one end to the shaft 51, as shown in Figs. 3 and 4. A brace 55 connects the upper end of the shaft 51 with a cross-piece 56 at the outer end of the jib and serves to support the jib. The lower end of the cross-piece 56, as shown at 57 in Fig. 4, projects down below the jib and serves as a stop to limit the outward movement of the carriage hereinafter described.

58 indicates a brace connecting the inner end of the jib with the upper end of the shaft 51.

59 indicates a brace connecting the inner end of the jib with the lower portion of the shaft 51, thereby effectually bracing the jib and securing it firmly to the shaft 51.

60 indicates a wheeled carriage mounted upon the jib 54 and adapted to travel thereon. Said carriage is provided with pulleys 61 62, over which travels a cable 63. The inner end of said cable passes around a pulley 64, mounted on a shaft 65, supported by the crane near the juncture of the shaft 51 and jib 54, as shown in Fig. 4.

66 indicates the drum of a winch, to which the inner end of the cable 63 is secured and upon which it is adapted to be wound. The drum 66 is mounted on a shaft 67, suitably supported by the crane-shaft 51, so that the drum rotates with said shaft 51. The shaft 67 carries a gear-wheel 68, with which meshes a pinion 69, mounted on a shaft 70, which carries cranks 71. By this construction by means of the cranks 71 the cable 63 may be drawn in or paid out.

In the bight of the cable 63, between the pulleys 61 62, is provided a block 72, which is provided with a hook 73, adapted to engage an eye 74, carried by the scraper 17, near its outer end, as shown in Figs. 3 and 4, so that when the cable 63 is drawn in or paid out the outer end of the scraper 17 is correspondingly adjusted. It will be understood that the braces 45 46 47 are connected to the scraper and to the car loosely enough, so that they do not interfere with the vertical adjustment of the outer end of the scraper. By thus providing a traveling carriage for supporting the outer end of the scraper its weight is properly supported at all times without interfering with its freedom of adjustment, the carriage traveling in or out upon the jib 54 to adapt itself to the different positions of the scraper 17.

75 indicates an auxiliary scraper which is provided at the rear end of the car and projects over the inner rail. If scrapers are provided at both sides of the car, auxiliary scrapers are provided over both rails. As shown in Fig. 2, the auxiliary scraper 75 is supported by bars 76 77, the inner ends of which are pivoted upon pivots 78 79, respectively, secured at the end of the car. The bars 76 77 are also pivoted to straps 80 81, secured at the back of the auxiliary scraper 75, as shown in dotted lines in Fig. 2. As also shown in Fig. 2, the bar 77 is provided with a series of holes 82, by means of which it may be adjusted as to its connection with the pivot 79, thereby vertically adjusting the auxiliary scraper 75. Said scraper is provided with a recess 83 to receive the rail, so that a portion 84 of said scraper projects down beside the rail and serves to effectually clear away earth or ballast therefrom.

85 indicates an auxiliary scraper provided at the front end of the car. Said auxiliary scraper is arranged slightly in advance of the front end of the main scraper, of which it forms substantially a continuation. It is supported by rods 86 87, which are carried by brackets 88 89, rigidly secured to the car. Said rods are vertically adjusted by means of a hand-wheel 90, which is mounted on a shaft 91, journaled in the brackets 88 89 and carrying a worm 92, which engages worm-wheels 93, as shown in Fig. 6. The worm-wheels 93 are internally screw-threaded, and the rods 86 87 are also provided with screw-threads, as shown at 94 in Fig. 6, so that when the worm-wheels 93 are rotated the rods 86 87 are caused to rise or fall, thereby vertically adjusting the auxiliary scraper 85. The auxiliary scraper 85 also is provided with a notch 95 to receive the rail, as shown in Fig. 2.

In operation the main scraper being in operative position the car is hauled parallel with the surface over which the ballast or earth is to be spread, any necessary vertical adjustment being effected by the operators on the car. If the front end only of the scraper 17 is to be vertically adjusted, the crank 44 is rotated. If desired, however, the outer end of the said scraper may be vertically adjusted simultaneously with its inner end, in which case the cranks 71 are rotated with the crank 44, or when the outer end of the scraper alone is to be adjusted it may be accomplished by operating the winch alone. The adjustment of the auxiliary scrapers is of course independent of that of the main scraper. The main scraper may be detached by simply withdrawing the pivot-pin 23 and the pins 50.

That which I claim as my invention, and desire to secure by Letters Patent, is—

1. In a machine of the class described, the combination of a car, a scraper, a universal joint connecting the inner portion of said scraper with the car whereby the outer portion thereof may be swung vertically and horizontally upon said joint, and means for supporting the outer portion of said scraper in its different positions of adjustment, substantially as described.

2. In a machine of the class described, the combination of a car, a scraper, means connecting the inner portion of the scraper with the car, means carried by the car for vertically adjusting the inner portion of the scraper and independent means for supporting and vertically adjusting the outer portion of the scraper, substantially as described.

3. In a machine of the class described, the combination of a car, a scraper, means pivotally connecting the inner portion of the scraper with the car so that the outer end thereof may swing vertically, means supporting the outer portion of the scraper, and means carried by the car for vertically adjusting the inner portion of the scraper, substantially as described.

4. In a machine of the class described, the combination of a car, a scraper, means connecting the inner portion of said scraper with the car, and mechanism adapted to travel toward and from the car for supporting the outer portion of said scraper, substantially as described.

5. In a machine of the class described, the combination of a car, a scraper, means connecting the inner portion of the scraper with the car, a crane having a projecting jib, a carriage adapted to travel on said jib, and means connected with said carriage for supporting the outer portion of the scraper, substantially as described.

6. In a machine of the class described, the combination of a car, a scraper, means connecting the inner portion of said scraper with the car so that it may swing vertically, and mechanism carried by the car for vertically adjusting the outer portion of the scraper, substantially as described.

7. In a machine of the class described, the combination of a car, a scraper, guides carried by the car, a vertically-movable support mounted on said guides, and means connecting the inner portion of the scraper with said support so that the outer end thereof may swing vertically, substantially as described.

8. In a machine of the class described, the combination of a car, a scraper, guides carried by the car, a vertically-movable support mounted on said guides, means connecting the inner portion of the scraper with said support so that the outer end thereof may swing vertically, and means for vertically adjusting the outer end of said scraper, substantially as described.

9. In a machine of the class described, the combination of a car, a scraper, a rotary disk carried by said scraper near the inner end thereof, means pivotally connecting said disk with the car, and means supporting the outer portion of the scraper, substantially as described.

10. In a machine of the class described, the combination of a car, a scraper, a rotary disk carried by said scraper near the inner end thereof, a vertically-movable support carried by the car, and means pivotally connecting said disk with said support, substantially as described.

11. In a machine of the class described, the combination of a car, a scraper, a vertically-movable support carried by the car, a universal joint connecting the inner portion of the scraper with said support and independently-adjustable means supporting the outer portion of the scraper, substantially as described.

12. In a machine of the class described, the combination of a car, a scraper, a vertically-movable support carried by the car, a universal joint connecting the inner portion of the scraper with said support, and traveling means supporting the outer portion of the scraper, substantially as described.

13. In a machine of the class described, the combination of a car, a scraper adapted to project laterally therefrom, and traveling mechanism supported by the car and movable toward and from the car for supporting the outer portion of said scraper, substantially as described.

14. In a machine of the class described, the combination of a car, a scraper adapted to project laterally therefrom, a universal joint connecting the inner portion of the scraper with the car, and means supported by the car and movable toward and from the car for supporting the outer portion of the scraper, substantially as described.

15. In a machine of the class described, the combination of a car, a laterally-projecting scraper connected therewith, a crane mounted on the car and having means adapted to project beyond the side of the car for supporting the scraper when in operative position and a carriage traveling on said supporting means, substantially as described.

16. In a machine of the class described, the combination of a car, a laterally-projecting scraper connected therewith, a swinging crane mounted on the car and having means adapted to project beyond the side of the car for supporting the scraper when in operative position and a carriage traveling on said supporting means, substantially as described.

17. In a machine of the class described, the combination of a car, a scraper projecting laterally beyond the side thereof, and means mounted on the car for bodily raising or lowering the scraper, meanwhile maintaining it in operative position, substantially as described.

18. In a machine of the class described, the combination of a car, a scraper projecting laterally beyond the side thereof, means pivotally connecting the inner portion of the scraper with the car, and means mounted on the car for pivotally adjusting the scraper vertically, meanwhile maintaining it in operative position, substantially as described.

19. In a machine of the class described, the combination of a car, a scraper pivotally connected with the car, rack-and-pinion mechanism connected with the one end portion of the scraper for vertically adjusting the same, and separate means connected with the other end portion of the scraper for vertically adjusting the same, substantially as described.

20. In a machine of the class described, the combination of a car, a scraper, rack-and-pinion mechanism connected with one end portion of the scraper for vertically adjusting the same, and a crane mounted on the car and connected with the other end portion of the scraper for vertically adjusting the same, substantially as described.

21. In a machine of the class described, the combination of a car, a laterally-projecting scraper, a crane mounted on the car, a traveling carriage mounted on the crane, a cable passing over said carriage and connected with the outer portion of the scraper, and means for vertically adjusting the forward portion of the scraper, substantially as described.

22. In a machine of the class described, the combination of a car, a scraper pivotally connected with the car, mechanism connected with one end portion of the scraper for vertically adjusting the same, and traveling mechanism connected with the other end portion of the scraper, said traveling mechanism being supported by and movable toward and from the car, substantially as described.

23. A scraping-machine, comprising a car, a scraper adapted to project laterally therefrom, means connecting said scraper with the car so that it may swing vertically and horizontally, and means traveling toward and from the car for supporting the outer portion of the scraper in its various positions of adjustment, substantially as described.

24. A scraping-machine, comprising a car, a scraper adapted to project laterally therefrom, means supporting said scraper so that its end portions are independently vertically adjustable, and means for angularly adjusting the scraper, substantially as described.

25. A scraping-machine, comprising a car, a scraper adapted to project laterally therefrom, means supporting said scraper so that its end portions are independently vertically adjustable, means for angularly adjusting the scraper, and a universal connection between said scraper and the car, substantially as described.

26. In a machine of the class described, the combination of a car, a scraper projecting laterally beyond the side thereof, and mechanism mounted on the car and connected with the inner and outer end portions of the scraper for bodily adjusting the same vertically, meanwhile maintaining it in operative position, substantially as described.

27. In a machine of the class described, the combination of a car, a scraper connected therewith and projecting laterally beyond the side thereof, and means mounted on the car and connected with the inner and outer end portions of the said scraper for vertically adjusting the same, substantially as described.

28. In a machine of the class described, the combination of a car, a scraper projecting laterally beyond the side thereof, means carried by the car and having a portion extending laterally beyond the side thereof, for supporting the outer portion of the scraper and means carried by the car and connected with the outer and inner portions of the scraper for vertically adjusting the same, substantially as described.

29. In a machine of the class described, the combination of a car, a scraper adapted to project laterally therefrom and arranged to swing toward and from the car, and means mounted on the car and connected with the outer and inner end portions of the scraper for vertically adjusting the same, substantially as described.

THOMAS R. McKNIGHT.

Witnesses:
J. C. BEEDE,
WM. D. FOULKE.